United States Patent [19]
Wicksteed et al.

[11] 3,724,414
[45] Apr. 3, 1973

[54] APPARATUS FOR SPREADING BUTTER AND LIKE SPREADABLE SUBSTANCES

[75] Inventors: Robert James Wicksteed, Kettering; David Henry Wood, Uxbridge, both of England

[73] Assignee: Spiro Engineering Limited, Kettering, England

[22] Filed: Mar. 17, 1971

[21] Appl. No.: 125,090

[52] U.S. Cl. ..................118/1, 118/13, 118/247, 118/262, 118/608
[51] Int. Cl. ..................................B05c 1/02
[58] Field of Search............118/13, 262, 247, 1, 2, 6, 118/608; 107/1 F, 36, 40

[56] References Cited

UNITED STATES PATENTS 249,938   11/1881   Holmes........................107/36 X
2,182,068  12/1939  Clark............................118/13
2,614,522  10/1952  Snyder........................118/1 UX
3,137,591  6/1964   Schoutissen...................118/13

Primary Examiner—John P. McIntosh
Attorney—E. M. Eckelman

[57] ABSTRACT

Apparatus for spreading butter including a butter-applying roller is rotatably mounted in a container and has a portion of its periphery extending through a slot in the container. A toothed kneading member is also rotatably mounted in the container adjacent the butter-applying roller, the teeth on the kneading member extending between abutments fixed in the interior wall of the casing. A feed conveyor or roller is provided for feeding slices of bread past the butter-applying roller.

5 Claims, 5 Drawing Figures

PATENTED APR 3 1973 3,724,414

INVENTOR
ROBERT JAMES WICKSTEED ET AL
BY E.M. Eckelman
ATTORNEY

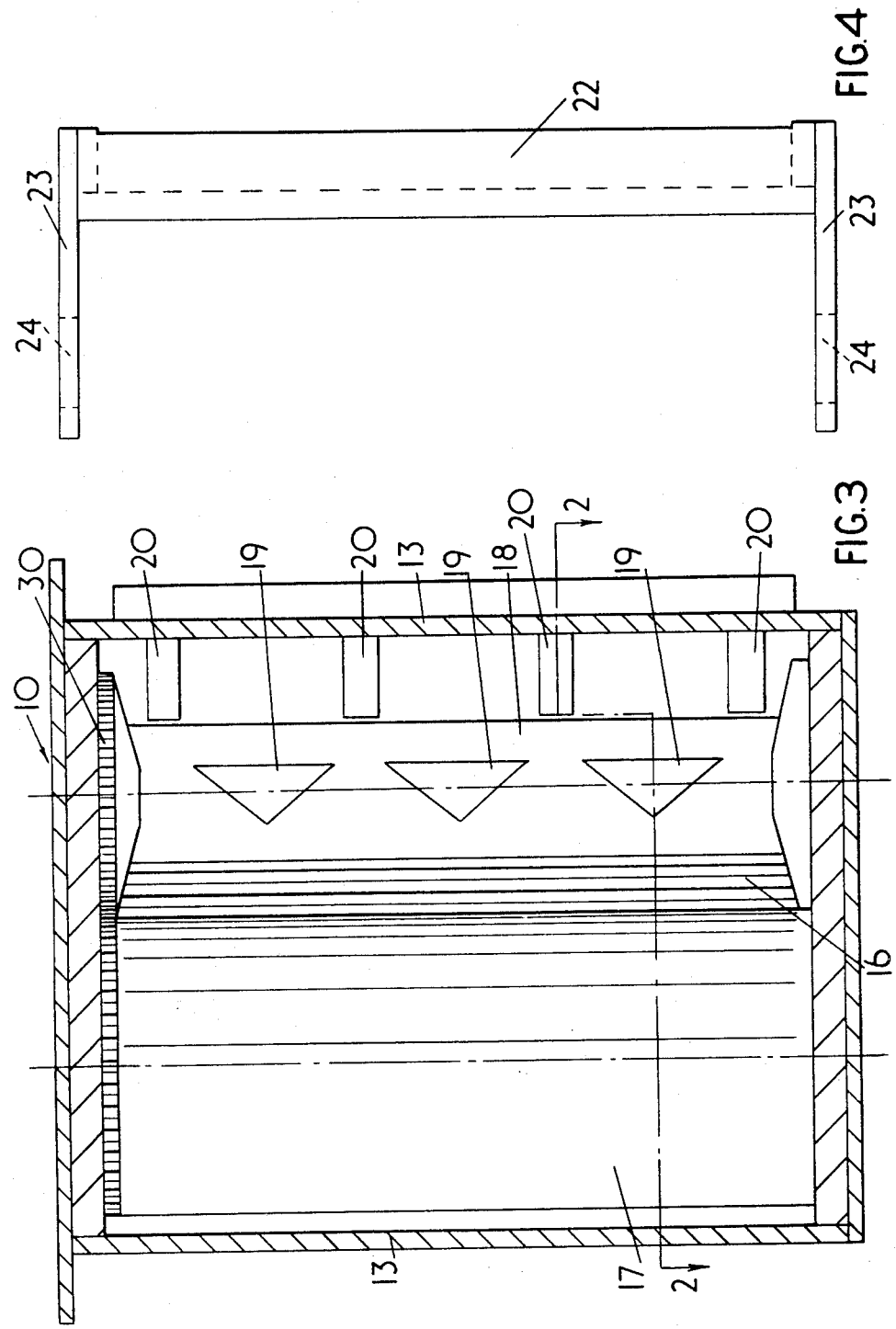

APPARATUS FOR SPREADING BUTTER AND LIKE SPREADABLE SUBSTANCES

The present invention relates to apparatus for spreading butter and like spreadable substances.

Whilst the invention is primarily directed to the spreading of butter and to slices of bread, it will be readily appreciated that the same principles are also applicable in other fields where it is desired to apply any spreadable material (e.g., margarine, cream or paste) onto other comparatively rigid flat surfaces of bakery products (e.g., rolls or cake).

An object of the present invention is to provide an apparatus for spreading butter and like substances onto a base surface in an accurate, predetermined thickness.

A further object of the invention is to provide an apparatus for spreading butter and like substances which is efficient in operation, of simple construction, easy to service and comparatively inexpensive to produce.

In the accompanying drawings:

FIG. 3 is a plan view of the container shown in FIG. 2 with parts omitted for the sake of clarity, and FIG. 4 is a plan view of the butter scraper shown in FIG. 2.

Figure 1:
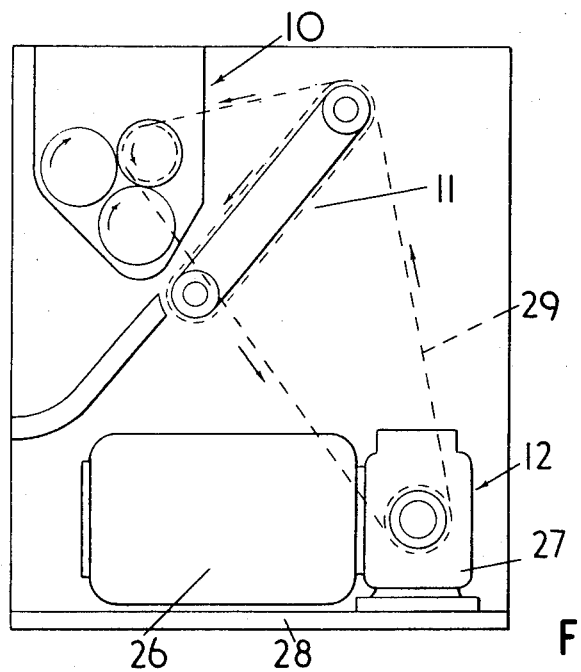
FIG. 1 is a diagrammatic side elevation of a butter spreading apparatus according to the present invention.

In carrying the invention into effect according to one convenient mode, by way of example, the apparatus basically comprises a butter container 10, an endless belt or conveyor 11 for feeding slices of bread past the butter container 10 and a power unit 12 for driving the conveyor 11 and other mechanism in the container 10.

The butter container 10 extends the full width of the bread slices (not shown) and has walls 13 which converge at their lower ends to form a slot 14 extending transversely to the direction of movement of the bread slices. A butter-applying roller 15, rotatably mounted on a horizontal axis, has a portion of its periphery projecting through the slot 14 to contact the bread slices as hereinafter described. The periphery of the butter applying roller 15 has longitudinal grooves 16 (FIG. 3) extending parallel to its axis of rotation.

A further or second roller 17, rotatably mounted on an axis parallel to the first axis, is positioned above and to one side of the butter-applying roller 15 and the purpose of this second roller is to direct the butter towards the butter-applying roller 15 and a kneading member 18 to be hereinafter described.

The directional roller 17 rotates in the same direction as the butter-applying roller 15 and only a small space separates the peripheries of the two rollers 15, 17. The container wall 13 closely conforms to a portion of the periphery of the directional roller 17.

The kneading member 18 is also rotatable on an axis which is parallel to the two rollers 15, 17, but in the opposite direction. This member 18 is of generally cylindrical shape and has a plurality of axially spaced pairs of diametrically opposed teeth 19 extending from the surface thereof. Preferably, the teeth 19, when viewed end-on, are of triangular form (see FIG. 3) and when rotating, almost contact the peripheries of the two rollers 15, 17. A plurality of fixed abutments 20 extend from the container wall 13 adjacent the member 18 into the spaces between the pairs of teeth 19. It will be readily appreciated that the spaced pairs of teeth 19 and abutment arrangement 20 provides an efficient kneading action. Furthermore, the teeth 19 may be arranged in a single row, or more than two rows, depending on the ambient temperature and type of butter.

A blade 21 for controlling the thickness of the butter being applied, is slidably mounted on one of the converging walls 13 of the container 10 and terminates adjacent the periphery of the butter-applying roller 15. The other end of the blade 21 is operatively associated with a control knob which is mounted on a screwed spindle (not shown).

Figure 2:
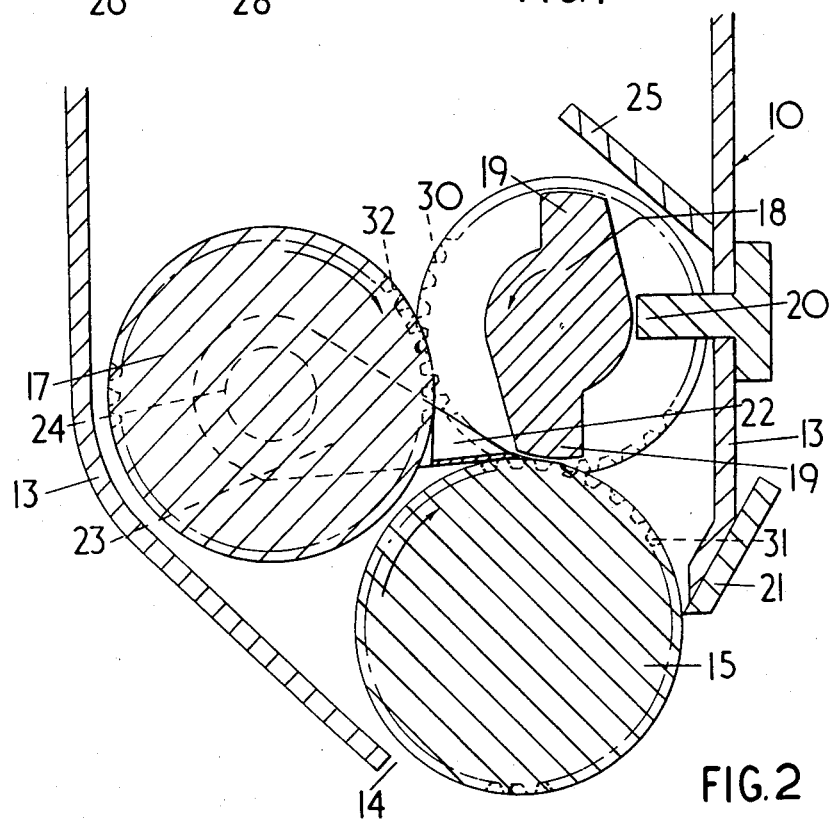
FIG. 2 is a sectional view through the butter container of the apparatus shown in FIG. 1.

An elongated plate 22 (FIGS. 2 and 4) has a supporting arm 23 on each end which is apertured at 24 to permit mounting of the plate 22 on the axis of the directional roller 17 as shown in FIG. 2. If desired, the plate 22 may be held in shallow slots in the end walls of the container 10. The plate 22 prevents excessive butter from passing between the rollers 15 and 17. A deflector 25 prevents the butter rising up the wall 13 of the container 10.

An alternative arrangement (not shown) for controlling the thickness of butter being applied comprises a rod of substantially semi-circular cross-section, positioned adjacent the periphery of the butter-applying roller in place of the blade 21, which is rotatable on its axis to vary the butter thickness.

An electric motor 26 and associated gear reduction unit 27 is mounted on the base plate 28 of the apparatus and a Vee-belt or chain transmits the drive to the conveyor 11 and kneading member 18. A gear 30 on the latter member transmits the drive to gears 31 and 32 on the butter-applying and directional rollers 15 and 17, respectively. The linear speed of the conveyor 11 is different to the peripheral speed of the butter-applying roller 15 so that a "wiping" action is achieved.

The surface of the endless belt or conveyor 11 extends at an angle of approximately 45° to the horizontal and feeds the bread slices tangentially against the periphery of the butter-applying roller 15. If desired, a feed roller (not shown), positioned directly under the butter-applying roller 15, may be used instead of the conveyor 11. With such an arrangement, the periphery of the roller is preferably stepped so that the two outer surfaces are slightly below the center, which arrangement ensures a more even distribution of the butter on each bread slice.

Figure 5:
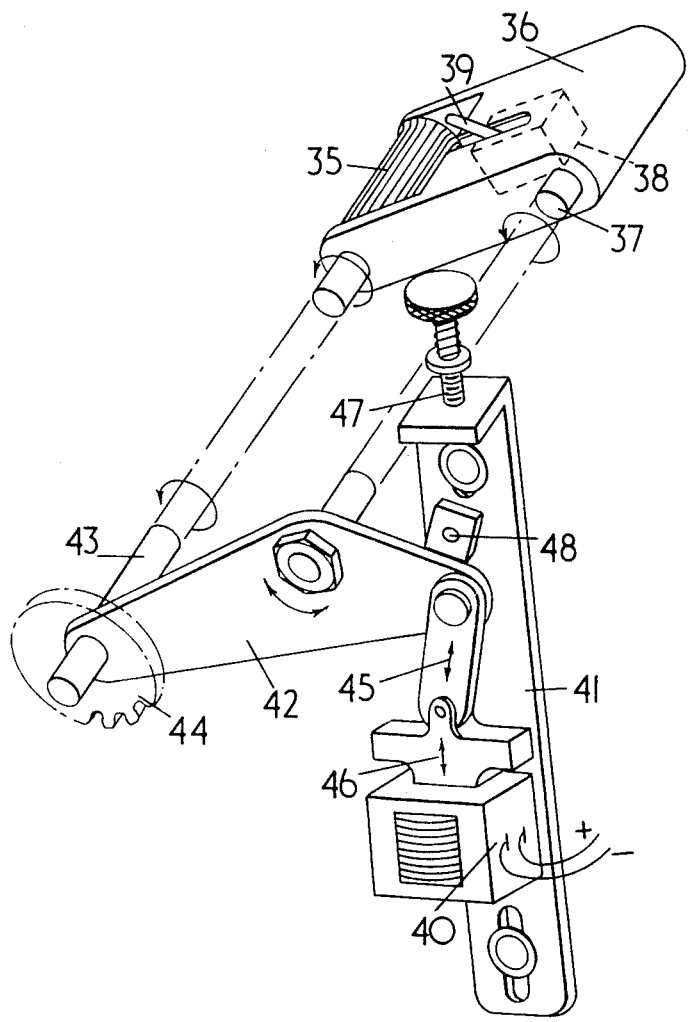
FIG. 5 is a diagrammatic view of a modified feeding means.

In another modification shown in FIG. 5, a feed roller 35 is rotatably mounted in one end of a platform 36, the other end of which is pivotally mounted on a spindle 37. The platform 36 is provided with a microswitch 38, the operating lever 39 of which protrudes above the surface of the platform. The switch 38 is electrically connected to a solenoid 40 mounted on a bracket 41.

The spindle 37 is connected to the apex of a generally triangularly shaped lifting plate 42, one end of which is provided with a drive spindle 43 for the feed roller 35 which is driven by a sprocket 44. The other end of the plate 42 is provided with a pivotally mounted link 45 connected to the armature 46 of the solenoid 40.

The upper end of the bracket 41 is provided with a screwed member 47 for adjusting the mechanism to accommodate varying thicknesses of bread slice. The lower end of the screwed member 47 is in alignment with an abutment member 48 mounted on the lifting plate 42. In use, the leading edge of a bread slice, on contacting the operating lever 39, causes the microswitch 38 to actuate the solenoid 40 which causes the platform 36 to pivot about its spindle 37 so that the feed roller 35 moves towards the butter-applying roller. As the trailing edge of the slice passes over the operating lever of the switch, the solenoid is de-energized and the feed roller moves away from the butter-applying roller. This arrangement is effective in preventing butter from being applied to the crust portion of a bread slice. Thus by de-energizing the solenoid and allowing the squeeze pressure between the rollers to be released just before the trailing edge of the bread passes the rollers, butter is prevented from being spread over the edge.

If desired, the directional roller 17 may be dispensed with, in which case the wall 13 of the container adjacent roller 17 is moved inwardly so that it is positioned adjacent the kneading member.

What we claim is:

1. Apparatus for spreading butter and like spreadable substances comprising a container for the butter, a rotatable butter-applying roller within the container having a portion of its periphery projecting through a slot in the container, a rotatable kneading member positioned adjacent to said butter-applying roller within the container, a plurality of axially spaced teeth on said kneading member, a plurality of abutments fixed within the container and extending into the spaces between said teeth, a feed roller rotatably mounted in one end of a pivotally mounted platform, a micro switch mounted beneath said platform, an operating lever for the micro switch protruding above the surface of the platform, a solenoid electrically connected to said switch for moving the platform and associated feed roller towards the butter applying roller when a slice of bread passes therebetween, a lifting plate, a spindle pivotally supporting said platform and connected to said plate, a drive sprocket for said feed roller mounted on said plate, and a link interconnecting said plate and said solenoid.

2. Apparatus for spreading butter and like spreadable substances comprising a container for the butter, a rotatable butter-applying roller within the container having a portion of its periphery projecting through a slot in the container, a rotatable kneading member in said container extending parallel to and positioned adjacent to said butter-applying roller, a plurality of axially spaced teeth on said kneading member arranged in the rotation of said kneading member to pass closely adjacent to the surface of said butter-applying roller in transverse relationship, a plurality of abutments fixed within the container and extending into the spaces between the teeth, and means for feeding slices of bread or other baked goods having a flat surface to receive the butter tangentially against the portion of the periphery of the butter-applying roller which projects from said container.

3. Apparatus as claimed in claim 2 including a second roller rotatably mounted above and to one side of the butter-applying roller for directing butter toward said kneading member and butter-applying roller, the second roller being arranged such that the teeth on said kneading member also pass closely adjacent to the surface thereof in transverse relationship.

4. Apparatus as claimed in claim 2 including a second roller rotatably mounted above and to one side of the butter-applying roller for directing butter toward said kneading member and butter-applying roller, the second roller being arranged such that the teeth on said kneading member also pass closely adjacent to the surface thereof in transverse relationship, said butter applying roller and said second roller rotating in the same direction and said kneading member rotating in the opposite direction.

5. Apparatus for spreading butter and like spreadable substances comprising a container for the butter, a rotatable butter-applying roller within the container having a portion of its periphery projecting through a slot in the container, a rotatable kneading member positioned adjacent to said butter-applying roller, a plurality of axially spaced teeth on said kneading member, a plurality of abutments fixed within the container and extending into the spaces between the teeth, a feed roller for feeding slices of bread or other baked goods having a flat surface to receive the butter tangentially against the surface of the butter applying roller, said feed roller being rotatably mounted in one end of a platform the other end of which is pivotally mounted, a switch-actuated solenoid connected to said platform and arranged to move the platform and associated feed roller toward the butter-applying roller when a slice of bread or the like passes therebetween.

* * * * *